United States Patent
Frese et al.

(10) Patent No.: US 8,447,511 B2
(45) Date of Patent: May 21, 2013

(54) METHOD FOR CONTROLLING A HYBRID VEHICLE AND HYBRID VEHICLE

(75) Inventors: Thomas Frese, Menden (DE); Richard Aumayer, Diekholzen (DE)

(73) Assignee: Robert Bosch GmbH, Stuttgart (DE)

(*) Notice: Subject to any disclaimer, the term of this patent is extended or adjusted under 35 U.S.C. 154(b) by 945 days.

(21) Appl. No.: 11/990,195

(22) PCT Filed: Jun. 12, 2006

(86) PCT No.: PCT/EP2006/063086
§ 371 (c)(1),
(2), (4) Date: Mar. 9, 2009

(87) PCT Pub. No.: WO2007/017300
PCT Pub. Date: Feb. 15, 2007

(65) Prior Publication Data
US 2009/0326748 A1    Dec. 31, 2009

(30) Foreign Application Priority Data
Aug. 9, 2005 (DE) .................. 10 2005 037 553

(51) Int. Cl.
*G01C 21/00* (2006.01)

(52) U.S. Cl.
USPC ......... 701/400; 701/22; 701/425; 180/65.275

(58) Field of Classification Search
USPC ............... 701/22, 23, 25, 26, 201, 202, 400, 701/411, 425; 180/65.21, 65.275
See application file for complete search history.

(56) References Cited

U.S. PATENT DOCUMENTS

| | | | |
|---|---|---|---|
| 5,815,824 A | | 9/1998 | Saga et al. |
| 5,832,396 A * | | 11/1998 | Moroto et al. .................. 701/22 |
| 5,842,534 A * | | 12/1998 | Frank .......................... 180/65.25 |
| 6,005,494 A | | 12/1999 | Schramm et al. |
| 6,487,477 B1 * | | 11/2002 | Woestman et al. ............. 701/22 |
| 6,507,127 B1 * | | 1/2003 | Amano et al. ............. 290/40 C |
| 6,687,607 B2 * | | 2/2004 | Graf et al. ........................ 701/99 |
| 6,701,248 B2 * | | 3/2004 | Petzold et al. ................. 701/533 |
| 6,864,807 B2 * | | 3/2005 | Todoriki et al. ............... 340/988 |
| 7,908,080 B2 * | | 3/2011 | Rowley et al. ................ 701/423 |
| 2002/0142885 A1 * | | 10/2002 | Graf et al. ...................... 477/115 |
| 2003/0009269 A1 | | 1/2003 | Graf et al. |
| 2004/0030471 A1 | | 2/2004 | Faye |
| 2005/0228553 A1 * | | 10/2005 | Tryon ............................. 701/22 |

FOREIGN PATENT DOCUMENTS

| | | |
|---|---|---|
| DE | 100 05 581 | 10/2000 |
| DE | 101 28 758 | 12/2002 |
| JP | 8240435 | 9/1996 |
| JP | 8331772 | 12/1996 |
| JP | 2001298805 | 10/2001 |
| JP | 2001314004 | 11/2001 |
| JP | 2005127873 | 5/2005 |

\* cited by examiner

*Primary Examiner* — Paul N Dickson
*Assistant Examiner* — James English
(74) *Attorney, Agent, or Firm* — Kenyon & Kenyon LLP

(57) ABSTRACT

A method for controlling a hybrid vehicle having at least two propulsion engines. According to the specification of an operating controller, propulsion is provided via the first propulsion engine, in particular an internal combustion engine, and/or the second propulsion engine, in particular an electric motor. The percentage contribution of the propulsion of the second propulsion engine is controlled as a function of the data pertaining to the travel route communicated to the operating controller, taking into account a charge state of an energy accumulator. An optimized operating strategy is determined by specifying a geographic destination and/or a destination parameter of the operating strategy, the travel route being selected by taking into account the optimized operating strategy when alternate travel routes are available.

16 Claims, 1 Drawing Sheet

METHOD FOR CONTROLLING A HYBRID VEHICLE AND HYBRID VEHICLE

BACKGROUND INFORMATION

Vehicles that use different sources of energy for operating the vehicle are referred to as hybrid vehicles. Hybrid vehicles having one internal combustion engine and at least one electric motor are known. The electrical energy of the electric motor comes from an energy accumulator, e.g., one or a plurality of batteries and/or supercapacitors ("supercaps"). In addition, the vehicle has the possibility of recovering braking energy in the form of electrical energy (recovery). An operating strategy is intended to ensure that the two propulsion engines are operated at the particular optimum and that braking energy arising is recovered for storage with as little loss as possible. The purpose of hybridization is to reduce the consumption of primary fuels compared to conventional vehicles that are operated only with internal combustion engines.

A method for controlling a hybrid vehicle is described in German Patent Application No. DE 101 28 758, the propulsion being provided by a first internal combustion engine and/or an electric motor according to the specification of an operating controller, the percentage contribution of the electric motor drive being controlled as a function of the data pertaining to the travel route communicated to the operating controller, taking into account the charge state of an energy accumulator for electrical energy, the data including altitude information which is used as the basis for controlling the percentage contribution of the electric motor drive, the charge of the energy accumulator not dropping below a minimum level which is defined or definable in the operating controller and is necessary to still ensure basic vehicle functions. The operating controller receives the altitude information from data of a navigation system or of another predictive system.

SUMMARY OF THE INVENTION

A method is provided in which an optimized operating strategy is determined by specifying a geographic destination and/or a destination parameter of the operating strategy, the travel route being selected by taking into account the optimized operating strategy when alternate travel routes are available. Advantageously, it is possible to optimize the operating strategy by applying predictive data from the travel route. A desired charge state of the energy accumulator of the hybrid vehicle may be specified, e.g., as a destination parameter. If in particular the altitude profile and additional information concerning alternate travel routes are known, the travel route may be selected by taking into account the performance parameters of the hybrid vehicle. If such information is used for optimizing the operating strategy, the propulsion engine, the energy of which is stored in the energy accumulator, may increasingly be used in a first part of the travel route if downhill grades with increased need for braking may be expected in the second part of the travel route. The increased discharge of the energy accumulator in the first part of the travel route enables the system to absorb recovered energy more easily and if necessary at higher efficiency in the second part of the travel route. Preferably an internal combustion engine is provided as the first propulsion engine and an electric motor as the second. However, other types of propulsion engines are also possible. A vehicle in which propulsive energy is generated from two sources of propulsion, in particular different propulsion engines, it being possible for the propulsive energy to be recovered, for example by braking, is referred to as a hybrid vehicle. The recovered energy may be used immediately and/or stored for later use. The recovered energy may be used for propulsion and/or for other consumers. The energy accumulator is expediently an electrical accumulator if one of the propulsion engines is an electric motor. However, other accumulators are also possible. Internal combustion engines and electric motors may be used as propulsion engines. Other propulsion engines are also conceivable.

It is favorable if data of a navigation system with respect to altitude differences and/or road categories and/or distance and/or anticipated driving time are used for selecting a suitable travel route. Navigation systems may use different data sources for optimizing the travel route for a given destination. In addition to road routes, maps in data memories may contain a large amount of additional information, e.g., information concerning uphill and downhill grades, information concerning anticipated driving speeds for determining a speed distribution in the generator based on knowledge of the available road types (urban, highway, expressway), information concerning anticipated stop phases, e.g., in city centers, which is also differentiated according to time of day, taking into account the traffic volume, e.g., in the rush hour. Additional data sources are, e.g., traffic radio or radio beacons providing information concerning traffic congestion announcements or slow-moving traffic, or vehicle communications including information from preceding vehicles.

Expediently, current information concerning the alternate travel routes with respect to a current and/or anticipated traffic volume of the particular travel route and/or the time of day and/or the start/stop phases of the hybrid vehicle to be expected at the time of day may be used for selecting a suitable travel route.

Favorably, at least one parameter from the group fuel balance, final charge state of the energy accumulator, total driving time may be used as a selection criterion for the travel routes.

Advantageously, if a destination parameter cannot be expected to be achieved, the selection may be made more dynamic by modifying the selected travel route while retaining the operating strategy.

Alternatively, if a destination parameter cannot be expected to be achieved, the selection may be made more effective by modifying the operating strategy while retaining the selected travel route.

A hybrid vehicle is also described in which means are provided for determining an optimized operating strategy by specifying a geographic destination and/or a destination parameter of the operating strategy, the travel route being selected by taking into account the optimized operating strategy when alternate travel routes are available. The hybrid vehicle has a first propulsion engine, in particular an internal combustion engine and a second propulsion engine, in particular an electric motor. Energy which is obtained in specific operating phases, for example, may be stored in an energy accumulator. The energy accumulator may be a battery, for example, for storing electrical energy of an electric motor, which may be operated as a generator in a braking operation or when driving downhill, and charges the energy accumulator. In so doing, this propulsive energy is partially recovered. Other energy accumulators, e.g., supercapacitors, flywheels, and the like may also be provided. Recovered energy may be used immediately or stored for later use. The recovered energy may be used for propulsion and/or for other consumers. In addition to internal combustion engines and electric motors, other drives as well as combinations including other drives are also possible.

DETAILED DESCRIPTION

Figure 1:
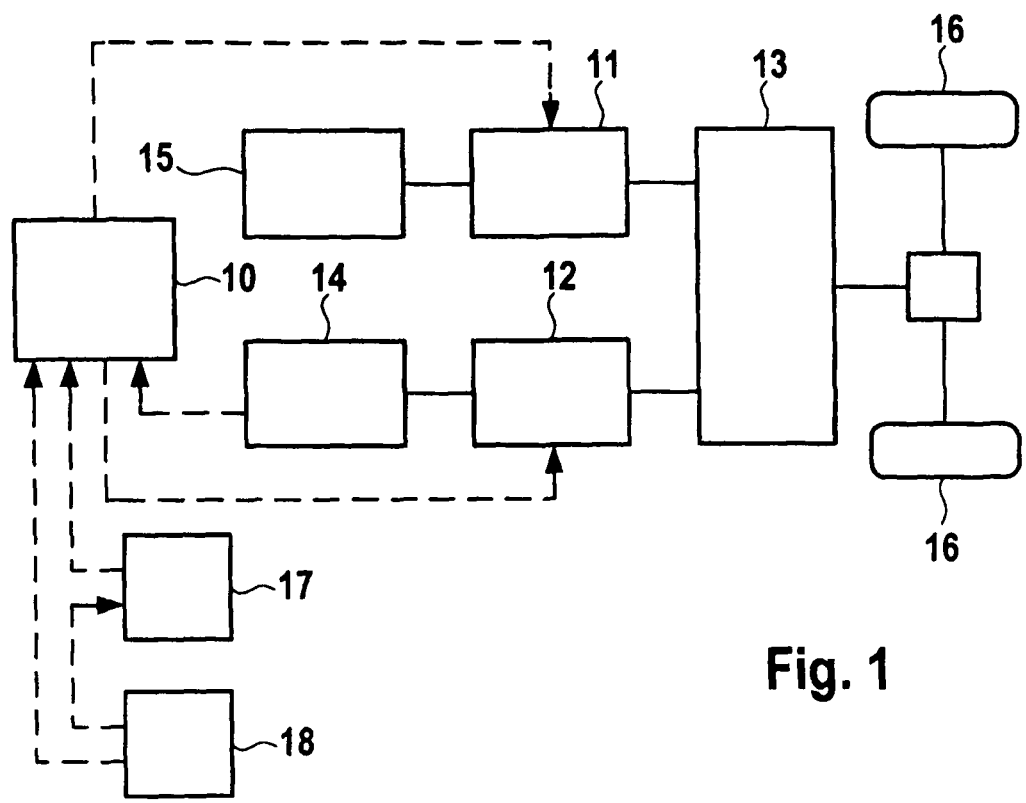
FIG. 1 shows a schematic diagram as an example of a preferred parallel hybrid vehicle.

FIG. 1 shows a schematic diagram of a preferred parallel hybrid vehicle having a first propulsion engine 11, an internal combustion engine and a second propulsion engine 12, an electric motor, in which the torque of internal combustion engine 11 and electric motor 12 are added. The present invention may also be applied to other types of hybrid vehicles such as a serial hybrid vehicle, a power-branching hybrid vehicle, or even mixed hybrids.

Fuel is supplied to internal combustion engine 11 from a fuel tank 15; power is supplied to electric motor 12 from an energy accumulator 14, e.g., a battery. Internal combustion engine 11 and electric motor 12 provide propulsion power to drive wheels 16 via a transmission 13.

An operating controller 10 controls internal combustion engine 11 and electric motor 12, the percentage contribution of the electric motor drive being controlled as a function of the data pertaining to a travel route of the hybrid vehicle communicated to operating controller 10, taking into account a charge state L of energy accumulator 14.

Operating controller 10 receives the data from a navigation system 17 which holds the necessary data on a storage medium. In particular, these data include information concerning road categories, altitude profiles, and distances. Additional data may be received via a receiver 18 which makes such data available to navigation system 17 and/or operating controller 10, e.g., information concerning the current traffic situation via traffic radio, global positioning system (GPS), radio beacons and/or vehicle communication with preceding vehicles.

Figure 2:
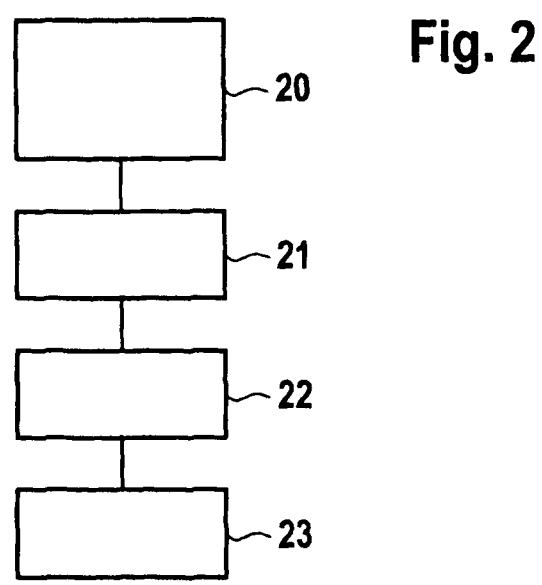
FIG. 2 shows a preferred sequence of the method according to the present invention.

FIG. 2 shows a preferred sequence of the method according to the present invention.

In a first function block 20, the destination is entered, the current location being known. Additional destinations and/or benefits that the user would like to realize may be entered, e.g., a full energy accumulator at the destination to make engine-independent air conditioning possible before resuming travel, a desired duration of travel, and the like.

A travel route including alternate travel routes is calculated in a second function block 21. In so doing, it is possible to take into account the shortest route, the fastest route, a route on or off an expressway, excluding or not excluding specific road categories, including or excluding city center areas, and the like.

The travel route is selected in a third function block 22. A starting charge state of energy accumulator 14, an anticipated engine speed distribution corresponding to the road categories, an anticipated number of start/stop events taking into account the time of day, an altitude profile, and the like may be used as a basis. Preferred selection criteria for the travel route are an expected fuel balance, a final charge state of the energy accumulator, a total travel time. Furthermore, an effort is made to implement the destinations and/or benefits specified by the user as much as possible.

In a fourth function block 23, the user is informed about the selected travel route, and the navigation is carried out accordingly. If necessary, additional information concerning fuel consumption or a possibility for the user to select a more economical travel route in exchange for increased travel time may be offered.

The travel route may be made more dynamic or adapted if it is not expected that the user's set destination or benefits will be realized. The optimized operating strategy may be retained. As an alternative, the travel route may be retained and the operating strategy modified. This may be optionally specified by the user.

What is claimed is:

1. A method for controlling a hybrid vehicle having at least first and second propulsion engines, comprising:

providing propulsion via at least one of the first propulsion engine and the second propulsion engine according to a specification of an operating controller; and controlling a percentage contribution of the propulsion of the second propulsion engine according to (a) an optimized operating strategy that is based on data pertaining to a travel route communicated to the operating controller, and (b) a charge state of an energy accumulator;

wherein the optimized operating strategy is determined based on:

information pertaining to a user-input geographic destination; and at least one user-input parameter from the group including a desired final charge state of the energy accumulator and a desired total driving time.

2. The method according to claim 1, wherein the first propulsion engine is an internal combustion engine and the second propulsion engine is an electric motor.

3. The method according to claim 1, wherein the travel route is selected by taking into account performance parameters of the hybrid vehicle.

4. The method according to claim 1, wherein data of a navigation system with respect to at least one of (a) altitude differences, (b) road categories, (c) distance, and (d) anticipated driving time is used for selecting a suitable travel route.

5. The method according to claim 1, wherein current information concerning alternate travel routes with respect to at least one of (a) a current and/or anticipated traffic volume of a particular travel route, (b) a time of day, and (c) start/stop phases of the hybrid vehicle to be expected at the time of day is used for selecting a suitable travel route.

6. The method according to claim 1, wherein at least one parameter from the group fuel balance, final charge state of the energy accumulator, and total driving time is used as the at least one selection criterion.

7. The method according to claim 1, further comprising, if a destination parameter cannot be expected to be achieved, making a selection more dynamic by modifying the selected travel route while retaining the operating strategy.

8. The method according to claim 1, further comprising, if a destination parameter cannot be expected to be achieved, making a selection more dynamic by retaining the selected travel route while modifying the operating strategy.

9. A hybrid vehicle having a drive which can be operated according to a specification of an operating controller via at least one of a first propulsion engine and a second propulsion engine, comprising:

an arrangement for controlling a percentage contribution of a propulsion of the second propulsion engine according to (a) an optimized operating strategy that is based on data pertaining to a travel route communicated to the operating controller, and (b) a charge state of an energy accumulator;

an arrangement for determining the optimized operating strategy based on:

information pertaining to a user-input geographic destination; and at least one user-input parameter from the group including a desired final charge state of the energy accumulator and a desired total driving time.

10. The hybrid vehicle according to claim 9, wherein the first propulsion engine is an internal combustion engine and the second propulsion engine is an electric motor.

11. The hybrid vehicle according to claim 9, wherein the hybrid vehicle is constructed such that propulsive energy recovered in individual operating phases is suppliable to consumers of energy provided by the energy accumulator directly or via buffer accumulator devices in the energy accumulator.

12. A method for controlling a hybrid vehicle having at least first and second propulsion engines, comprising:
   providing propulsion via at least one of the first propulsion engine and the second propulsion engine according to a specification of an operating controller; and
   controlling a percentage contribution of the propulsion of the second propulsion engine as a function of data pertaining to a travel route communicated to the operating controller, taking into account a charge state of an energy accumulator;
   wherein the travel route is selected from a set of potential travel routes (a) to meet at least one selection criterion, and (b) to maximize satisfaction of at least one user-input parameter including desired final charge state of the energy accumulator.

13. A method for controlling a hybrid vehicle having at least first and second propulsion engines, comprising:
   selecting an engine optimization plan for a travel route from a first location to a user-input destination; and
   controlling a respective percentage contribution of each of the first and second propulsion engines for driving the vehicle through the travel route;
   wherein the selecting of the engine optimization plan includes selecting the travel route from a plurality of travel routes that extend between the first location and the user-input destination, a parameter of the selection of the travel route being optimization of the respective percentage contributions of the first and second propulsion engines during travel between the first location and the user-input destination.

14. The method according to claim 13, wherein the optimization of the respective percentage contributions is calculated considering at least one of an expected fuel balance and a final charge state.

15. The method according to claim 13, wherein the optimization of the respective percentage contributions is calculated considering respective altitude profiles of different ones of the plurality of travel routes.

16. The method according to claim 13, wherein the optimization of the respective percentage contributions is calculated considering respective engine speed distributions of different ones of the plurality of travel routes.

* * * * *

UNITED STATES PATENT AND TRADEMARK OFFICE
CERTIFICATE OF CORRECTION

PATENT NO. : 8,447,511 B2  
APPLICATION NO. : 11/990195  
DATED : May 21, 2013  
INVENTOR(S) : Frese et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1451 days.

Signed and Sealed this
Eighth Day of September, 2015

Michelle K. Lee
*Director of the United States Patent and Trademark Office*